US006477565B1

(12) United States Patent
Daswani et al.

(10) Patent No.: US 6,477,565 B1
(45) Date of Patent: Nov. 5, 2002

(54) METHOD AND APPARATUS FOR RESTRUCTURING OF PERSONALIZED DATA FOR TRANSMISSION FROM A DATA NETWORK TO CONNECTED AND PORTABLE NETWORK APPLIANCES

(75) Inventors: Neil Daswani, Edison, NJ (US); Suman Kumar Inala, Santa Clara, CA (US); Ramakrishna Satyavolu, Santa Clara, CA (US); P Venkat Rangan, San Diego, CA (US); Sreeranga P. Rajan, Santa Clara, CA (US)

(73) Assignee: Yodlee.com, Inc., Redwood Shores, CA (US)

( * ) Notice: Subject to any disclaimer, the term of this patent is extended or adjusted under 35 U.S.C. 154(b) by 0 days.

(21) Appl. No.: 09/398,320

(22) Filed: Sep. 16, 1999

Related U.S. Application Data

(63) Continuation-in-part of application No. 09/323,598, filed on Jun. 1, 1999, now Pat. No. 6,199,077.

(51) Int. Cl.[7] .............................................. G06F 15/16
(52) U.S. Cl. ........................ 709/217; 709/250; 709/246
(58) Field of Search ................................ 709/217, 246, 709/250, 228, 229, 238; 713/201

(56) References Cited

U.S. PATENT DOCUMENTS

| | | | | |
|---|---|---|---|---|
| 6,014,429 A | * | 1/2000 | LaPorta et al. | 379/88.15 |
| 6,205,473 B1 | * | 3/2001 | Thomasson et al. | 709/217 |
| 6,252,544 B1 | * | 6/2001 | Hoffberg | 342/357.1 |
| 6,253,326 B1 | * | 6/2001 | Lincke et al. | 713/201 |
| 6,266,615 B1 | * | 7/2001 | Jin | 701/213 |
| 6,286,029 B1 | * | 9/2001 | Delph | 709/203 |
| 6,289,389 B1 | * | 9/2001 | Kikinis | 709/239 |
| 6,324,569 B1 | * | 11/2001 | Ogilvie et al. | 709/206 |
| 6,351,464 B1 | * | 2/2002 | Galvin et al. | 370/356 |
| 6,380,890 B1 | * | 4/2002 | Smith et al. | 342/357.09 |

OTHER PUBLICATIONS

Anonymous, Dialog File 20 (World Reporter). No. 3629961. 3Com Announces the Palm VII Connected Organizer, the First Handheld Solution for Out–Of–The–Box Wireless Internet Access. Business Wire Dec. 2, 1998. 4 pages especially p. 1, lines 18–33, p. 2, lines 1–10, p. 3, lines 21–30 and p. 4, lines 2–17 and lines 21–24.

* cited by examiner

Primary Examiner—Zarni Maung
(74) Attorney, Agent, or Firm—Donald R. Boys; Central Coast Patent Agency, Inc.

(57) ABSTRACT

A system for retrieving and disseminating information records from Internet sources includes a client device and an intermediary server system, including software, between the client device and the Internet. The system collects a record specific to a client from an individual one of said Internet sources in a first form in which the record is recorded at the Internet source, transforms the record from the first form to a second form specific to an application other than an Internet browser application, the application executable by the client device, and transmits the transformed record to the client device for display in the application other than an Internet browser application executable by the client device. In some cases the client device connects by a data link that is not Internet-compatible link. Data mining on the Internet specific to clients and client devices is taught, with aggregation services and synchronization for keeping a client up-to-date efficiently for changing data content.

40 Claims, 3 Drawing Sheets

METHOD AND APPARATUS FOR RESTRUCTURING OF PERSONALIZED DATA FOR TRANSMISSION FROM A DATA NETWORK TO CONNECTED AND PORTABLE NETWORK APPLIANCES

CROSS-REFERENCE TO RELATED DOCUMENTS

The present application is a continuation-in part to U.S. patent application Ser. No. 09/323,598 filed on Jun. 1, 1999 and entitled "Method and Apparatus for Obtaining and Presenting WEB Summaries to Users", now U.S. Pat. No. 6,199,077 the content of which is incorporated in its entirety by reference.

FIELD OF THE INVENTION

The present invention is in the field of network information services including data gathering and transmission over wired and wireless network connections and pertains more particularly to restructuring of personal data and, in some cases, general data for the purpose of enabling receipt of such data by a variety of connected and portable network appliances without requiring added hardware or software.

BACKGROUND OF THE INVENTION

The information system known in the art as the Internet, and the Internet subset known as the World Wide Web (WWW), represents the largest publicly available source of information in the world. Anyone with an Internet-capable appliance and an Internet connection can navigate the Internet for the purpose of accessing virtually any type of data that may be held in any one of millions of network-connected servers adapted for the purpose.

The most traditional network appliance used for navigating the Internet and downloading data therefrom is the personal computer (PC). More recently however, a host of other electronic communication devices have been adapted for network connection and navigation on the Internet. Some of these better known devices include cellular telephones, personal digital assistants (PDA's), pagers, and notebook and laptop computers. Some types of these appliances access the Internet via wireless connection. In other cases, data from the Internet is transmitted to such devices through a gateway to a network generic to the device. An example would be that of a cellular phone or pager capable of accessing e-mail and other Internet accounts information.

The Internet operates under a shared bandwidth protocol wherein data packets are transmitted whereby each transmission competes with all other current transmissions for available bandwidth resources. The total amount of bandwidth resource available to network appliances accessing the Internet is a function of network traffic, reliability and capability of lines, power of appliance processor, nature of intermediary network, and a host of other variables. It is not always possible to maintain an Internet connection for any reliable length of time considering all of these variables. Sometimes, there are periods when a device simply cannot gain access at all. In other cases physical connection is only possible on a periodic basis, and an appliance is therefore only intermittently connected.

Even with the more powerful and traditional PC's or notebook computers there may be times when available bandwidth suddenly drops resulting in a disconnect or "moof" as it is often termed. If a moof occurs when attempting to download data, another attempt must be made to reaccess the network, re-navigate to the data source, and attempt a retry of the data download. This can be frustrating for users operating such devices as cell phones, pagers or PDA's which are already operating on high latency and/or low bandwidth connections.

Administrators of network equipment and connection architecture as well as companies that host such as WEB-based information services and the like are improving aspects of communication with various portable network devices by upgrading lines and equipment, developing better data compression and bandwidth reservation techniques and lobbying for more bandwidth for wireless intermediary networks. However, one area that has been largely overlooked is the very format and structures of data that is transmitted. For example, HTML or XML-scripted content is largely unsuitable for transmission under low bandwidth conditions to small portable devices. As a result, such devices having lower memory and operating under lower bandwidth resources are limited to certain types of data such as only e-mail or voice mail.

A system known to the inventor and listed under the cross-reference to related documents section provides a capability of automated login and navigation to Internet or other network-held sources written in HTML, XML, or other languages for the purpose of retrieving and presenting WEB summaries to subscribers according to client/enterprise directives. This service uses scripted templates prepared by knowledge workers using known site logic to enable navigation, not just to the site, but to specific content posted on the site. A parsing method is then used to identify appropriate data based on the provided script directives.

The data obtained by the above-described method is held in a server for user access (via PC), or pushed to a user (PC or alternate appliance) according to enterprise rules. The data is typically presented in the form of a WEB page made accessible to a user having suitable equipment for retrieving and viewing such pages. However, in another embodiment, the data is re-formatted when possible for transmission to a user specified Internet appliance such as a cell phone, laptop, PDA, etc. The user must first access the service using a device that supports a browser interface. Data is forwarded to alternate devices only on user request and assuming the user has configured his or her alternate device to the service. In order to receive some types of data, special software and/or hardware implementations must be made to the alternate appliances.

The above service does not support independent device access to the Internet (except for devices already capable of browser navigation), nor can it deliver certain content held in a format that is not readily convertible to a format generic to the software running on such alternate devices. Moreover much content that would be convertible may still overload the memory of certain alternate devices such as pagers or cell phones if additional data restructuring and synchronization steps are not taken.

It will be appreciated that there is a growing variety of existing and new portable-type devices that are being adapted for Internet access. Most of these devices communicate according to device-generic protocol and are unable to receive and disseminate certain other types of data under normal circumstance. Furthermore, low bandwidth connection states and limited memory provisions preclude many of these devices from broad Internet navigation capabilities and limit download capability in terms of time and type of data content that may be received.

What is clearly needed is a method and apparatus for intelligent restructuring of personalized data and, in some cases, generalized data from the Internet into model/device-specific data formats such that it may be easily made available for transmission to and presentation by a variety of known communication devices having either direct or indirect Internet connection capability. Such a method and apparatus would broaden the scope of Internet-sourced data types that a communication device could independently access and receive without requiring hardware or software modifications to such devices.

SUMMARY OF THE INVENTION

In a preferred embodiment of the present invention a system for retrieving and disseminating information records from Internet sources is provided, comprising a client device; and an intermediary server system including software between the client device and the Internet. The system collects a record specific to a client from an individual one of said Internet sources in a first form in which the record is recorded at the Internet source, transforms the record from the first form to a second form specific to an application other than an Internet browser application, the application executable by the client device, and transmits the transformed record to the client device for display in the application other than an Internet browser application executable by the client device.

In some embodiments the intermediary server system is connected to the Internet by an Internet-compatible link and the client device is connected to the intermediary server system by other than an Internet-compatible link. The other-than-Internet-compatible link may be an Internet Protocol Telephony link, a conventional telephony link operating by a conventional telephony protocol, a wireless cellular telephony link, or a wireless satellite-enhanced link.

In some embodiments there may be a personal computer (PC) connected to the intermediary server system by a conventional Internet-compatible link, and the client device connects to the PC by an other than Internet-compatible link, and wherein the system transmits the transformed record first to the PC which then transmits the transformed record to the client device.

Also in some embodiments the intermediary server system is a subscription system, and maintains client profiles for subscribers to the system, the client profiles including data relative to information destinations on the Internet for a specific client, data records to be retrieved from the destinations, and data forms for transformation of specific records.

In these and other embodiments the intermediary server system may maintain input and output templates for individual clients, the input templates having slots mapping records by type as received from Internet sources, and the output templates having slots mapping data records by type to be transmitted to the client, there being specific correlation between input template slots and output template slots for an individual client. Data forms for transformation to transmit to client devices may include one or more of conventional telephone protocol, Internet protocol telephony Protocol (IPNT), voice mail, e-mail, pager message, and records for applications common to personal digital assistants (PDAs), including one or more of appointment-book data records, memo-pad records, alarm records, and things-to-do records.

In some cases airline reservations retrieved for a client from the Internet are converted into multiple appointment-book entries displayable by an appointment-book application on a PDA, one appointment book entry for each individual flight in a reservation. In these cases there may be an alarm generated for each flight at a time preceding flight time for each flight. A different alarm interval may be used for domestic flights than for International flights.

In some cases billing schedules retrieved for a client may be converted into two or more records, one being a memo pad record detailing the details of the bill, and another being a things-to-do record to remind the client of the time the bill is due. In these cases an alarm record may be entered to generate an alarm prior to the time the bill is due, to remind the client that the bill is due.

There are a number of ways the system architecture might be arranged. In one alternative the intermediary server system is implemented in association with an Internet Service provider site. The intermediate server system may include an aggregation service for aggregating client-specific records prior to transmission to client devices. There may also be a synchronization service for keeping data on client devices synchronized with data from sources on the Internet and from the aggregation service. In one case the synchronization service uses an algorithm enabled to adaptively minimize round trip messages between the intermediary server system and the client device according to whether the client device is more limited by latency or bandwidth. The algorithm in some cases computes Cyclic Redundancy Check (CRC) codes for input and output records, and computes intersections between CRCs on records on the client device and at the aggregation service, the output of the algorithm being exactly the records that need to be sent to the client device and exactly the list of records that need to be deleted form the client device to keep the data sets in synchronization.

In another aspect of the invention a method for retrieving and disseminating information records from Internet sources is provided, comprising steps of (a) collecting a record in a first data form from an Internet source by an intermediary server system connected to the Internet; (b) transforming the record into a second data form specific to an application other than an Internet browser application, the application executable by a client device connectable to the intermediary server system; and (c) transmitting the transformed record to the client device for display with the client device connected by a data link to the intermediary server system. The method or a variation according to embodiments of the invention may be practiced with and within all of the apparatus and function variations described above.

In various embodiments of the present invention for the first time a server system is provided for retrieving and disseminating Internet-based data specific to individual clients, wherein clients may use devices that do not have or need an Internet connection capability or an Internet browser, but may still very clearly relate to the client all of the mined data, and wherein also the system can keep all data fresh and up-to-date for the client.

BRIEF DESCRIPTION OF THE DRAWING FIGURES

DESCRIPTION OF THE PREFERRED EMBODIMENTS

According to a preferred embodiment of the present invention, a method and apparatus is provided that allows virtually any Internet-based data to be accessed, restructured, and then transmitted to a wide variety of network-capable appliances without requiring special software or hardware additions to the receiving devices, and in a form that the receiving device may display the data using an existing application on the device typically used for an entirely different purpose and function. Such method and apparatus is described in enabling detail below.

Figure 1:
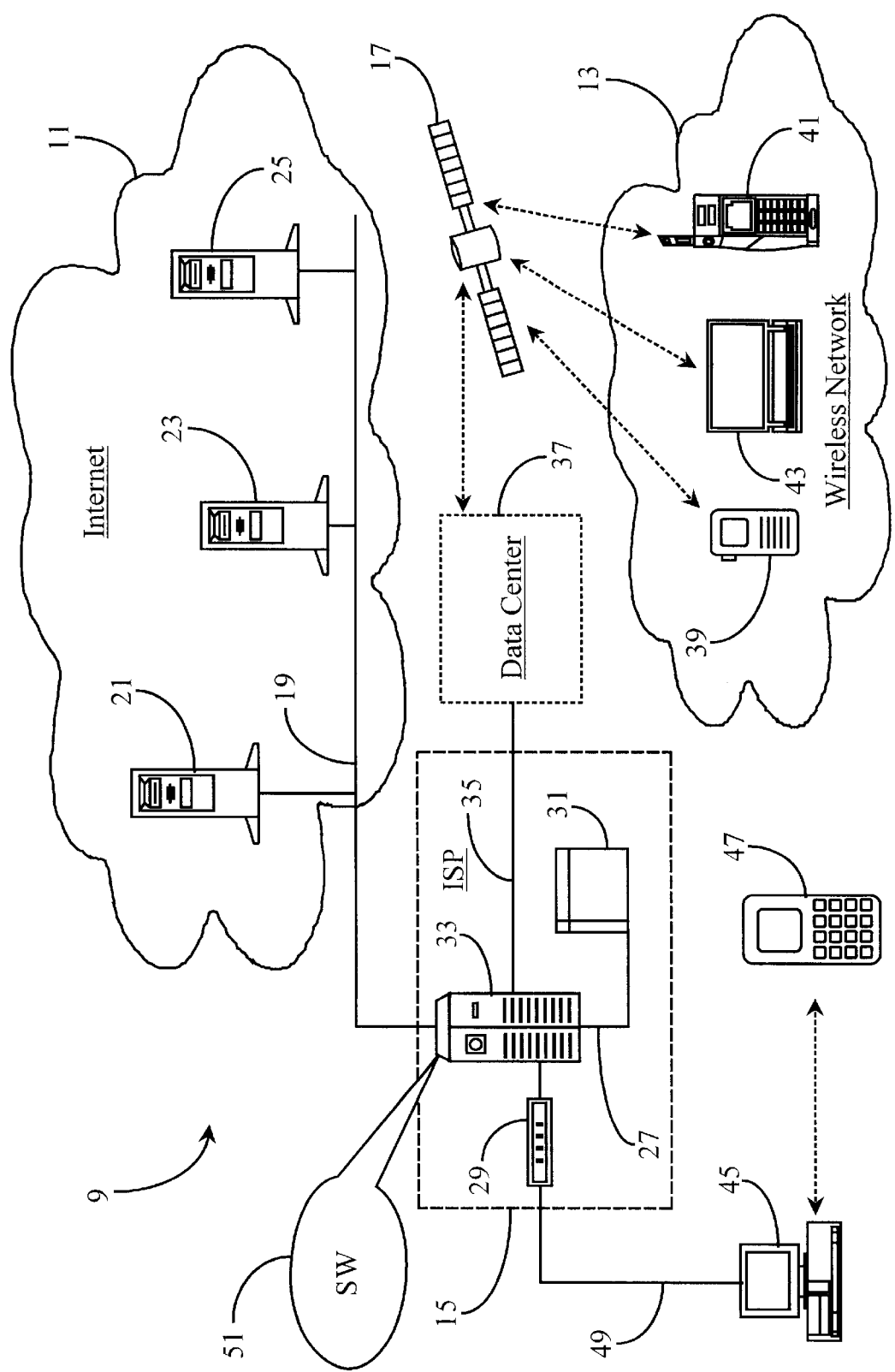
FIG. 1 is an overview of a communication network wherein a data aggregation and tunneling service is hosted and operated according to an embodiment of the present invention.

FIG. 1 is a basic overview of a communication network 9 wherein a data aggregation and tunneling service is hosted and operated according to an embodiment of the present invention. Communication network 9 comprises a data packet network 11, which is the well known Internet in this example, an Internet Service Provider (ISP) 15, and at least one exemplary wireless data network 13.

Network 11 may be another type of data packet network instead of the Internet such as perhaps a private or corporate wide area network (WAN) as long as Transfer Control Protocol/Internet protocol (TCP/IP) or other suitable network protocols are supported. Network 11, hereinafter referred to as Internet 11 for example purposes, is exemplified herein as a preferred embodiment because of the large public accessibility to the network. Such public accessibility lends to a preferred embodiment for hosting a large data-information service such as the service described in the cross-referenced application Ser. No. 09/323,598.

Internet 11 may comprise any geographical portion of the global network including such as data sub-networks connected thereto. Internet 11 has an Internet backbone 19 distributed throughout, which represents the many lines and connections making up the wired Internet. Three data servers 21, 23, and 25 are illustrated within Internet 11 and connected to backbone 19.

Servers 21–25 are, in this embodiment, file servers known in the art for serving data in such as hypertext markup language (HTML), XML, or other suitable languages associated with electronic information pages known as WEB pages in the art. It should be noted here that servers 21–25 are not limited to only serving WEB pages. In some embodiments, other data such as E-commerce data associated with on-line forms, digital authorization certificates, secure digital signature forms and the like, may also be held in such servers. Moreover, any one of servers 21–25 may be adapted as an E-mail server or may be subject to any other adaptation for serving data.

ISP 15 is adapted, in this example, for providing Internet connection services as known in the art. Illustrated within ISP 15 are a main connection server 33, a mass data-repository 31, and a modem bank 29. Main server 33 is directly connected to Internet 11 as shown. Main sever 33 is adapted to perform normal Internet service routines as known in the art, and is additionally enhanced via a unique software instance 51 for enabling practice of the present invention.

In one embodiment, an additional server may be provided for executing software 51 and enabling practice of the present invention in conjunction with main server 33. In another embodiment, more than one such server may be provided and adapted to execute individual instances of software 51. The inventor illustrates just one server 33 and SW 51 for the purpose of simplifying illustration and deems it sufficient for the purpose of explaining the present invention.

Main server 33 is connected to a data center 37 by a data link 35. Data center 37, among other tasks, provides an ISP (Internet) interface to server 33 for various wireless data networks represented by network 13. Network 13 is further characterized by the illustration of a communication satellite 17, which provides satellite rebroadcast of uplinked data streams from data center 37 and a backlink to data center 37 as illustrated by a dotted double arrow. As previously described, network 13 may be plural in the sense that plural wireless data networks common to certain communication devices may accomplish an interface to ISP 15 (server 33) through such as satellite 17 or another type of wireless transceiver/receiver and data center 37.

Within network 13 a variety of Internet capable appliances are illustrated. As examples there are a pager 39, a notebook computer 41, and a cellular telephone 43. In this example, appliances 39–43 broadcast data, which is picked up by satellite 17 and relayed to data center 37. Similarly, data arriving to satellite 17 from data center 37 is broadcast to and received by appliances 39, 43, and 41 as illustrated herein with dotted double arrows representing respective two-way communication links. In the case of appliances 39 and 43, network 13 might be a cellular network typically implemented for those devices. In the case of notebook 41, network 13 may be a wireless Internet service using cellular or other suitable wireless technologies.

As previously described, main server 33 is also connected to modem bank 29 as is known in the art of land-line Internet access through an ISP. A personal computer (PC) 45 operated by a user/subscriber to the service of the present invention is illustrated as connected to modem bank 29 by an Internet connection line 49. Line 49 may be a conventional telephone line, an integrated digital services network (ISDN) connection line, or any other suitable wired connection such as ADSL. A PDA 47 is illustrated by a dotted double arrow as having a wireless communication link to PC 45 as is common in the art of computer peripherals.

In the example of a subscriber service, data repository 31 would contain data about individual subscribers to the service of the present invention (user profiles and other user-specific records). Repository 31 may be an optical storage facility or any other convenient facility that is adapted for storing large amounts of data. Repository 31 is illustrated as connected to main server 33 by a data connection 27. In this example, repository 31 is considered an off-line storage facility that is accessible to server 33. In another embodiment repository 31 may be a part of server 33, or in any other network-connected location such as on-line, or on a connected local area network (LAN). In addition to holding data specific to individual subscribers such as account information, address parameters, user ID and authorization data, repository 31 may also hold data gathered from such as Internet 11 before being delivered to or being accessed by users.

SW 51 executing on server 33 is provided for the purpose of enabling a unique data-gathering and tunneling service that allows users operating such as appliances 39–43, and 47 to have structured access to data such as may be sourced in one of servers 21–25; and, to have the data restructured in an intelligent fashion for delivery to a specific Internet appliance that may not be normally adapted for receiving and displaying the data.

Software 51 provides, in this case, a unique subscriber service hosted by ISP 15 in which the service may be accessed and utilized by using any Internet-capable appliance. For the purpose of discussion, an Internet-capable appliance shall include any electronic communication device capable of a direct or indirect (through a connected network) connection to a data packet network such as Internet 11. Such devices may also include devices that may only receive data from such as Internet 11 as long as a separate device is used to access the service and upload a data request.

In practice of the present invention, a user operating such as cellular telephone 41, for example, accesses ISP 15 from anywhere in network 13 through a wireless path, exemplified herein by satellite 17 to data center 37, and registers a request for data. The data request in some cases may be manually initiated by a user, and in other cases automatically initiated on a periodic basis while the device is connected to the Internet. In some cases a request will be automatically initiated when the device connects to the Internet.

The nature of a request may vary under a broad set of rules set-up by a hosting enterprise (ISP 15) for types of requests. For example, one request may be for a data result of a site-specific search according to defined parameters such as was described in the characterization of a WEB summary disclosed in application Ser. No. 09/323,598. Another type of request may be for information about departure/arrival parameters and gate instructions associated with purchased airline tickets. Still another type of request may include a desire to access only the existing incoming mail from a certain individual or individuals. There are many possibilities. In a preferred embodiment a script for data requests may be a part of a user profile, and a single generic request from a user may trigger a variety of data searches and retrievals from Internet 11 on behalf of the user.

Data center 37 processes requests from network 13 and forwards them to main server 33 where they implemented. Various technological enhancements may be implemented in data center 37 to facilitate communication and interface capability with various portable appliances such as appliances 39–43. One example would be to provide an interactive voice response (IVR) unit (not shown) that may take a vocal or touch-tone initiated request originating from such as cell phone 43. Such an IVR may be included in data center 37 as a client interface.

The nature and content of a request from cell phone 43, for example, is analyzed and restructured into an equivalent Internet Protocol (IP) request that can be uploaded into main server 33 over data link 35. This process is, in a preferred embodiment, performed in data center 37 with the data center having access to a portion of software 51 dedicated to the specific function. In another embodiment, a specific portion of software 51 may be provided to be executable on a connected machine at data center 37 for the purpose of analyzing requests of varied protocol and restructuring them into requests that can be understood on server 33.

Once a request from cell phone 43 is registered in main server 33 as an IP data request, data about the user is accessed from repository 31 for verification and authorization purposes. A scripted template supplied by a knowledge worker (not shown) is provided for accessing site logic during navigation and parsing as initiated by SW 51. Such knowledge workers may be stationed at data center 37, ISP 15, or any other centralized location that is connected to the service by network connection. The scripting, navigating, and parsing technology is fully explained and detailed in the co-related application Ser. No. 09/323,598. However, further innovation is required in order to accomplish the goal of the present invention, which is the intelligent restructuring of data coming into and leaving from the service of the present invention.

In the present example a ready request is queued for execution by SW 51 according to on-demand or in a scheduled fashion. Server 33, upon executing the request, navigates to one or more of servers 21–25 (for example, as representative of plural servers in the Internet) holding the requested data. The location of the data is then identified according to site logic provided in the scripted template. Located data is then parsed for specified content to be returned. The resulting data is aggregated in repository 31 if the request has a scheduled delivery or user-access time. If the return data follows an on-demand criteria, then it is immediately processed and delivered over data link 35 to data center 37 for further processing before being broadcast over network 13 to a user operating such as cell phone 43.

In another aspect of the present invention, requests and return data may be registered and received by a user operating a PDA such as PDA 47, which is a peripheral to PC 45 illustrated as wired to Internet 11. In this embodiment, a user operating PDA 47 registers a request to PC 45. The request is analyzed and uploaded to server 33 under control from PDA 47. Additional processing concerning obtaining and returning information is the same as with previously described embodiment except that instead of using data center 37 as an interface, PC 45 acts as the interfacing machine. If requested data arrives to PC 45 in a format that is not discernable to PDA 47, then data restructuring may be performed in PC 45 by a provided instance of SW 51 that is dedicated to the purpose. PDA 47 would require no modification in either hardware or software. In yet another embodiment the client machine may be PC 45.

The method and apparatus of the present invention provides a unique capability of restructuring data in an intelligent way. That is, instead of simply converting one format of data into another, a first data set is analyzed and understood so that an alternate data set in a format specific to applications executable on a receiving device may be created that reflects the desired content and function of the first data set. More detail about how this is accomplished is provided below.

Figure 2:
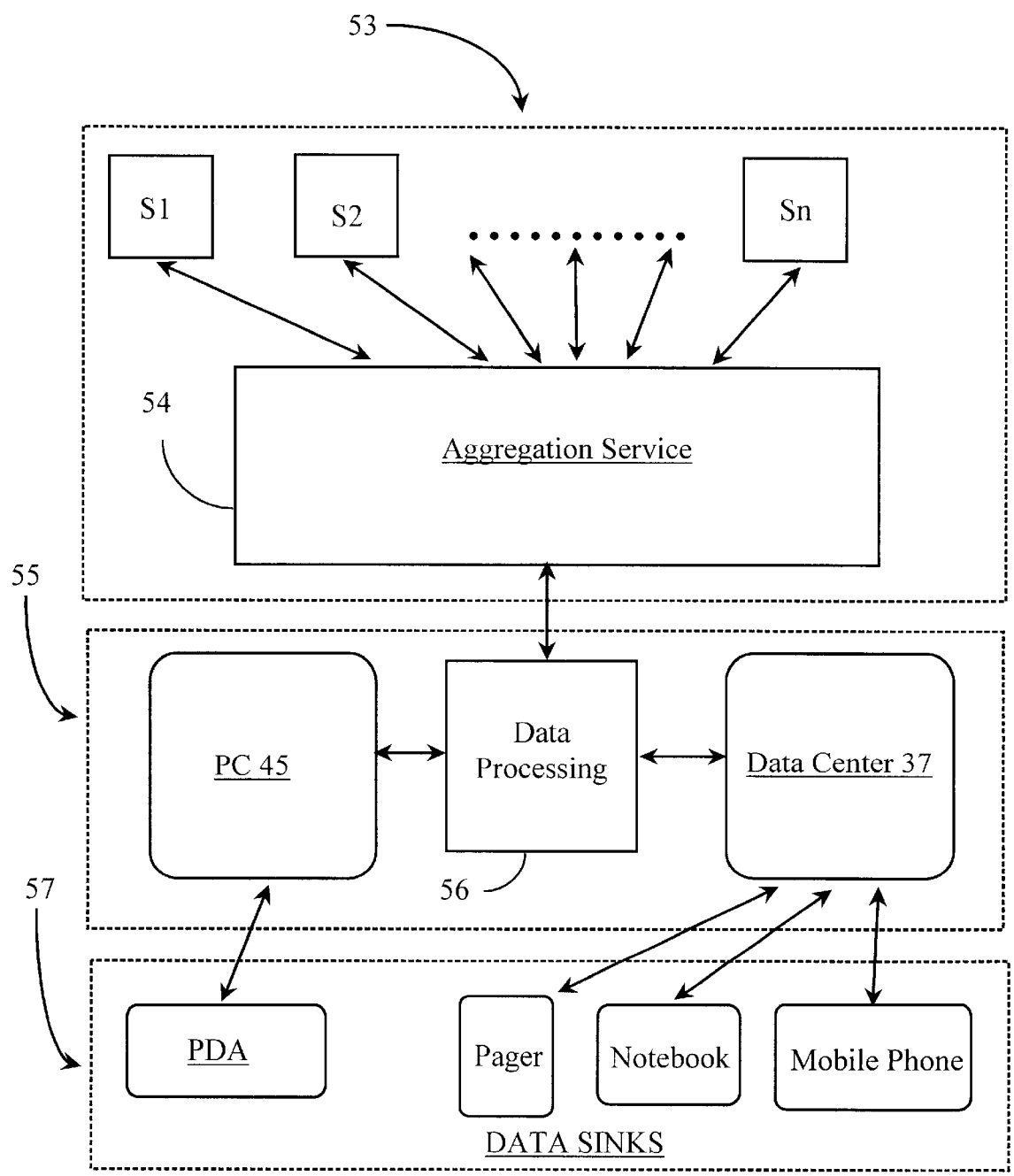
FIG. 2 is a block diagram illustrating an exemplary hierarchy existing between various components of the data aggregation and tunneling service of FIG. 1.

FIG. 2 is a block diagram illustrating an exemplary hierarchy and data transformation and flow existing between various components of the data aggregation and tunneling service of FIG. 1. The service of the present invention in a preferred embodiment comprises three basic component layers. These component layers are illustrated herein as layer 53, layer 55 and layer 57. Layer 53 is best described as a source-data interface layer. This portion of the service is dedicated to navigating to and obtaining data from Internet-connected data sources. Data sources (S)1–n are analogous to servers 21–25 of FIG. 1. It will be appreciated that the number of data sources that are available on a network such as Internet 11 (FIG. 1) is vast. Data collected from S1–Sn is continually aggregated into such as repository 31 (FIG. 1) as indicated by the bi-directional arrows linking each S1–Sn to aggregation service 54. Aggregated data is tagged according to requesting user and target receiving device.

Layer 53 includes all of the means and processes required for locating and parsing user-requested data according to site-specific scripting techniques and funneling the collected data back to aggregation for storage under a user-specific ID parameters. Most, if not all of the data retrieved in layer 53 will be in the form of HTML, XML, or a similar protocol. Other than XML types of data may include various multi-media types associated with audio and video data, animated graphic data, or still graphic data. All data requested by any one user is aggregated under that user's ID parameters.

Data stored in aggregation is forwarded to layer 55 according to a pre-assigned schedule for processing. Layer 55 provides an internal process comprising data restructuring and primary interface capabilities. Data processing is the first phase of layer 55 as illustrated by process 56. It is in the main the data processing phase that is unique and distinguishes the present invention from that disclosed in the copending and referenced application Ser. No. 09/323,598.

Instead of simply converting data from one language or format into another in an attempt to render it usable to a specific Internet appliance, the present invention seeks to rewrite original data in an alternate format or language that accurately represents the data presented in the original format in terms of content and function. Data expressed in this alternate format (standardized) is then restructured into the appropriate device-specific format for transmission.

To accomplish the above-described task, it is required that data obtained in layer 53 be at least machine-legible in its given language or format and understood by software 51. SW 51 must also know parameters encompassing the formats and data presentation schemes of various software routines used in various Internet-capable appliances. For example, an HTML description of a flight reservation and gate instruction as presented on an information page (WEB page) would not be expressed as a text block in such as an electronic calendar, or a PDA. Rather, the same information would have to be restructured and expressed as a series of entries expressing time and date functions associated with the particular flight schedule.

In a preferred embodiment, an algorithm is employed as part of software 51 that can take information from provided input data-templates and restructure the information to fit pre-designed and associated output data-templates. For example, an input template is created for one or more records of network-based data. The input template renders the original data into a proprietary language similar to HTML and XML. The proprietary language or code expresses the original data in a standard format that may then be manipulated by algorithm. The input template holds the rendered data according to mapped slots.

An output template is created that is generic to the parameters and presentation scheme associated with a specific Internet-capable appliance that will receive the data record or records. The output template holds the specific slots wherein data will be rendered by the algorithm. The algorithm uses provided data-restructuring rules to identify data contained in an input data template and re-map it by matching the data to appropriate data-slots presented in an output data template. As a result, one or more input records (parsed and rendered data) will produce one or more output records (data remapped by algorithm).

Data templates as described above, are not analogous to logic templates described in the co-related application Ser. No. 09/323,598. Data templates work in conjunction with scripted logic-templates used to find and parse the requested data. Input templates are request-generic while output templates are device-generic. For example, there are many variations of data formats and languages that can be used when presenting data on a WEB page. Therefore, an input template should be modeled to facilitate the specific data fields, language, and format in which requested data is expected to be found. In some cases, an input template may be enhanced to support a variety of differing formats and or languages, and be made to hold more slots for data not necessarily requested. The output template is device generic and contains only usable data-slots that may be presented on its associated device.

In one embodiment of the present invention, a knowledge base (not shown) could be provided as part of SW 51 and used to equate data parameters associated with frequently requested data types from a network to data parameters that are generic to various network appliances. In this method, categories and titles describing oft-requested data records such as flight reservations, account balance information, order status information, and the like are created, coded and stored in the knowledge base. Device-specific equivalents described as rules for presenting the type data to each specific model device are also stored in the knowledge base and equated.

When a data request comes in, a runtime engine (software application) takes the input data and finds the category and subtitle that matches it. Then the data presentation rules concerning the specific receiving device are matched from the knowledge base. In this way, appropriate output records may be created that are specific to the type and model of device that is targeted to receive the data.

In one embodiment, the knowledge base method is used in conjunction with the template/algorithm method. As use of the service progresses, the knowledge base is updated with new categories and subtitles associated with repetitive requests. The knowledge base may also be updated to reflect parameters associated with new types and models of network capable devices. There are many such possibilities.

Component layer 55 includes an interfacing data center such as data center 37 represented in FIG. 1 and a desktop PC such as PC 45 of FIG. 1. Output templates contain device specific data that is ready for transmission to target devices such as devices 39–47 of FIG. 1. As output templates are completed, they may be held for requesting users at a storage facility (not shown) held in a data center, or pushed to requesting users based on the original request. Similarly, output records destined for such as Internet-connected PCs may be held therein for remote access, or pushed to requesting users operating peripherals such as PDA 47 of FIG. 1.

Component layer 57 represents various network capable appliances as described above and their associated transmission networks. Illustrated within layer 57 is a PDA with a remote (wireless) link to PC in layer 55 as shown by double-arrow connecting line. Also illustrated within layer 57 is a pager, a notebook, and a mobile phone, all having remote (wireless) connections to the data center represented in layer 55 as shown by the double-arrow connecting lines. The PC illustrated in layer 55 may be a desktop PC operated by one or more users. In another embodiment, it may be a powerful workstation shared by many users. The represented data center has all of the interface means required to bridge the appliances of layer 57 to the service.

It will be apparent to one with skill in the art that knowledge workers associated with creating input and output templates may perform their services from anywhere in a connected network without departing from the spirit and scope of the present invention. In one embodiment, input templates are supplied by knowledge workers associated with the service, while output templates are created by knowledge workers that are associated with various network hosting entities.

In another embodiment, the service of the present invention may be provided as a turnkey package wherein companies may set-up their own specific information services using the implements of the present invention.

It will also be apparent to one with skill in the art that an intermediary language derived in part from HTML and XML languages may be proprietary in nature and used as an intermediary data-conversion language between such as pure HTML and device specific protocol without departing from the spirit and scope of the present invention. Codes specific to such an intermediate language may be licensed to entities wishing to recreate the service for their own purposes.

Figure 3:
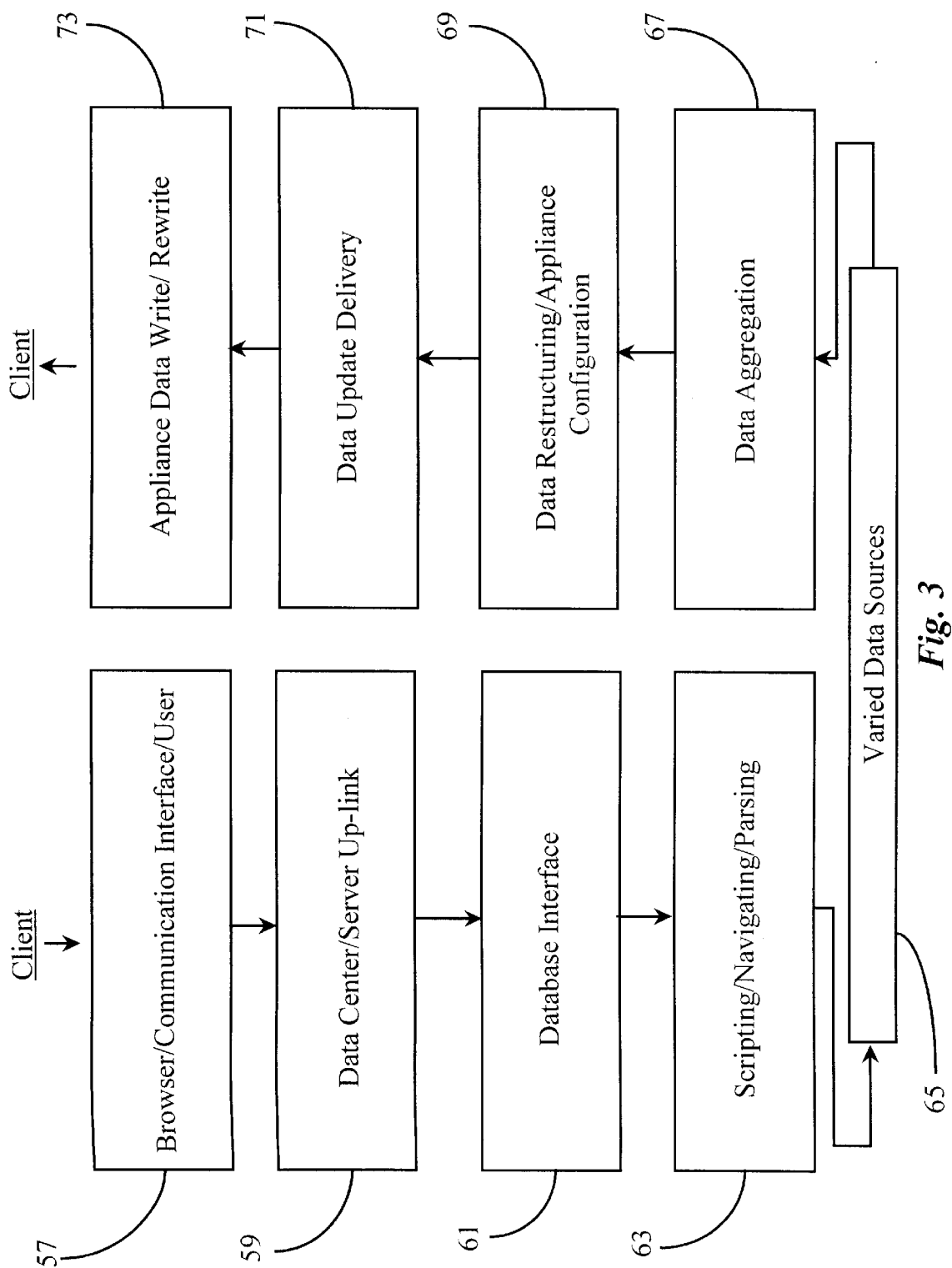
FIG. 3 is a block diagram illustrating an exemplary client request/result loop progressing through the various process phases attributed to a service of the present invention.

FIG. 3 is a block diagram illustrating client request/result loop progressing through the various process phases of the service of the present invention in a preferred embodiment. In step 57 a client (user/subscriber) initiates a request for data. Such a request may be initiated from a network capable appliance like appliances 39–43 of FIG. 1. A client may also initiate a request from a standard PC such as PC 45 of FIG. 1, or a PDA such as PDA 47 of FIG. 1. Browser software of any sort is not required for a device to access the service. In this way, a low bandwidth device may be used to practice the present invention without depending on a parent or associated machine. For example, devices not having IP capability or navigational software would interface with such as data center 37 of FIG. 1 in order to gain access. Appropriate equipment and means for bridging networks is made available in data center 37. An Internet-capable appliance having a browser function and Internet connection capability may, of course, gain access through normal wired or wireless channels.

In step 59, a request from a client is registered to the service. If the request is initiated from a device using a wireless network wherein a data center such as center 37 is the interface, then the request data may be converted from the protocol used by the requesting device to a suitable IP protocol for registering at a server such as server 33 in ISP 15 (FIG. 1). If an Internet-connected PC or workstation is the interface, and a requesting device is a remote peripheral such as PDA 47, then the original request will arrive already in suitable IP format.

In step 61, the client request is compared against a database for additional information about the initiator of the request and, perhaps to finish the package by associating the appropriate templates to the request. The templates may be stored under specific user ID for repeat requests, and created new for cases where no template is available. This includes the scripting templates of Ser. No. 09/323,598 as well as input/output templates of the present invention. Once all information and planned routines are incorporated into a request, it may be queued for execution.

In step 63, the service navigates to a data source or sources specified in the request on behalf of the client. Site-logic scripting provided by template, along with a data-parsing convention is used to locate and identify data associated with the client's request. Data sources will typically be information pages written in such as HTML or XML. However, this is not to be construed as a limitation. Other types of data as well as some multimedia content may be located and parsed according to site logic.

In step 67, all data obtained in step 63 is aggregated and tagged according to a user-specific and device specific manner. In some cases the data found during navigation is simply stored in one location for a client with the stored data retaining it's original format. In another case, data is rendered to an intermediate form of it's original language for the purpose of providing a standard format from whence further re-structuring may occur.

In step 69, aggregated data is restructured from its original format (if applicable) to it's final format (device specific) in preparation for transmission. In other cases, the data is stored for client access at his or her convenience. In a preferred embodiment, the above-described template method with algorithm is used. In an alternative method, a knowledge base technique is used. In still another embodiment, the two methods may be combined. It is assumed that by the time data restructuring occurs, an input and an output template containing the appropriate data fields pertaining to a target device have been provided. A software module (not shown) termed a data renderer converts the original data in aggregation into a suitable intermediary language that is understood to be standard to the system and compatible, in terms of further slot-mapping, according to any supported protocols specific to various network appliances interacting with the service. The intermediate language may be of a proprietary nature and licensed to other entities for use. In an embodiment wherein a knowledge base system is used, an intermediate language would not specifically be required.

The input template contains the rendered data in specific field-slots that are understood by the software algorithm. The algorithm also understands the field-slots associated with the output template. This is accomplished by creating specific rules for the algorithm to follow in operation. The algorithm re-maps the data from the input template into the field-slots in the output template according to the applicable rules. During this operation a second data renderer inserts and in some instances writes new data for insertion to specific field slots chosen by the algorithm.

In one embodiment, output templates may be provided with additional functional routines (based on the content of inserted data) that may be caused to activate a notification system or the like that is generic to a particular receiving device. For example, a round trip flight description may be rendered as a series of appointment book entries in such as a PDA. The additional notification routine in the output template may, according to the data, set an alarm or other audible alert to activate at a convenient time before the scheduled departure, as a reminder to the user.

In step 71 output records are delivered to specified devices through their respective interfaces and connected networks. In step 73, a receiving appliance incorporates the data in usual fashion. Steps 71 and 73 may also be construed as steps for delivering and incorporating only updates to existing information. For example, the client send/return loop represented by steps 57 through 73 can be initiated for one or more requests and then be reactivated to receive periodic updates to already received data. For example, input and output records already sent to a client may be stored at the service for reference and tagged with client ID, time, date, etc. If an update request comes in from a client it can be noted in a new output template designed to carry only the new information. During the process at step 69, the input template containing the previous data is compared to the input template containing the current data. The discrepant data in the new input template is remapped to appropriate field-slots in a new output template. In this way, the record only reflects the new data. In step 73 then, the new data overwrites the old data. Data obtained through the service may be routinely and periodically updated in a push or pull fashion.

In another embodiment, synchronization (updating) may be performed in step 63. For example, a new update request may arrive wherein the previous input record is obtained and used to partially direct the function of parsing during the navigation process. The rule would in effect direct the parser to designate only data that is different from the old input template for collection. In this case, the algorithm may be employed in reverse fashion so that the intermediate language in an input template may be converted back to original language as seen by a parser.

In still another embodiment, the parsing engine may be equipped to read both languages. The parsing process may also include the algorithm function for re-mapping the data.

It will be apparent to one with skill in the art that the method and apparatus of the present invention may be applied to the method and apparatus disclosed in the co-related application Ser. No. 09/323,598 to provide a new and unique service without departing from the spirit and scope of the present invention. It will also be apparent that the method and apparatus of the present invention may stand alone from Ser. No. 09/323,598 as long as a suitable method for site navigation and parsing is included in the new service.

The service of the present invention may be adapted to serve specific wireless networks and client/devices connected to them. It may also be broadened to include many wired communication networks, including the Internet and PSTN networks. Conventions may be provided to such as SW 51 for the location, parsing and restructuring of virtually any type of data that may be held on a digital network. Even conventions such as video may be played and interpreted by the service for data mapping to provided output templates for creating records that reflect the content or at least a summary of content contained in the video.

SPECIFIC EXAMPLES

The present invention in certain embodiments is to be first brought to the public after the filing of the present patent application by a new Internet company named Yodlee.com in Sunnyvale, Calif. In the first implementations the service practicing the present invention is called Yodlee2Go. Specific features of the Yodlee2Go service are included here as further examples of the present invention. In these examples restructured information is provided to onto the Palm™, but this information could be inserted onto any other mobile device as well. Many cell phones, for example, have calendar and address book applications built in, so the restructured information could be inserted onto those devices as well, and into many others.

1. Travel Reservations

If you book your travel reservations through an online travel agency such as BizTravel.Com or Travelocity.Com and you have added the travel site to your Yodlee home page, then your travel reservation information is synchronized onto your Palm, for example, into several places. For each travel reservation that you have:

a. One record is entered into your Date Book for each "leg" of the flight. The description of the record contains the airline name on which you will by flying, your flight number, and the departure and arrival airport codes.

b. In addition, an alarm is automatically set to go off one hour before your flight time. You may change the alarm time for a particular flight by clicking on the "Details" button in your Date Book. (You may also change the default alarm time to be different than one hour by changing your Yodlee2Go preferences. This is described in Section x of this user manual.)

c. If you click on the "Note" button in the Details dialog box, you can view your confirmation number, the price that you paid for the ticket, the flight mileage, and the name of the travel agency with which you booked the flight.

d. Since Yodlee2Go knows which travel agency you booked the flight with, it synchronizes the contact information for that travel agency into your address book. This way, you will have the phone number of the travel agency with you if you run into problems at the airport. (Also, don't forget that you have your confirmation number in the note attached to the date book record!)

e. Finally, since Yodlee2Go inserts a memo into your Memo Pad application containing the entire itinerary for each of your flights.

2. Frequent Flyer Miles

If you have added any airline sites in the frequent flyer miles category onto your Yodlee home page, then all of your frequent flyer information is copied into a single memo in your Memo Pad application on your Palm. The memo is titled "Frequent Flyer Miles" and can be accessed by clicking on the Memo Pad application on your Palm.

3. Bank Statements

If you do your online banking on the web, and you have added your bank's site to your Yodlee home page, then a summarized version of your bank statements will by synchronized into the Memo Pad application on your Palm. One memo will be created for each of your online bank accounts. Each memo will contain the balances in each of your accounts, and a total balance across all your accounts at that bank.<

4. Credit Card, Telephone Statements, and other Billing Information

If you have added any credit card or billing sites to your Yodlee home page, then this information will be synchronized onto your Palm to help you remember to pay your bills on time. For each bill, Yodlee2Go will insert one entry in your list of things to do in your To Do List application on your Palm device. The entry will contain the name of the company from which you received the bill, the due date, and the amount due by the due date. If you click on the "Details" button, and then click on the "Note" button to view more information about the bill.

5. Stock Portfolio Information

If you have added your online stock broker (such as E*trade) onto your Yodlee home page, then your stock portfolio information will be synchronized onto your Palm device by Yodlee2Go. Yodlee2Go will create one memo pad entry in your Memo Pad application that contains a consolidated statement of all of your stocks across all online brokerages that you have added to your Yodlee home page. The memo is titled "Stock Quotes," and also contains a summary of the total worth of all of your stock portfolios.

The methods and apparatus of the present invention have many broad applications and therefore should be afforded the broadest of scope. The methods and apparatus of the present invention are limited only by the claims that follow.

What is claimed is:

1. A system for retrieving and disseminating information records from Internet sources, comprising:

a client device; and an intermediary server system including software between the client device and the Internet;

wherein the system collects a record specific to a client from an individual one of said Internet sources in a first form in which the record is recorded at the Internet source, transforms the record from the first form to a second form specific to an application other than an Internet browser application, the application executable by the client device, and transmits the transformed record to the client device for display in the application other than an Internet browser application executable by the client device.

2. The system of claim 1 wherein the intermediary server system is connected to the Internet by an Internet-compatible link and the client device is connected to the intermediary server system by other than an Internet-compatible link.

3. The system of claim 2 wherein the other-than-Internet-compatible link is an Internet Protocol Telephony link.

4. The system of claim 2 wherein the other than Internet-compatible link is a conventional telephony link operating by a conventional telephony protocol.

5. The system of claim 2 wherein the other-than-Internet-compatible link is a wireless cellular telephony link.

6. The system of claim 2 wherein the other-than-Internet-compatible link is a wireless satellite-enhanced link.

7. The system of claim 1 further comprising a personal computer (PC) connected to the intermediary server system by a conventional Internet-compatible link, and the client device connects to the PC by an other than Internet-compatible link, and wherein the system transmits the transformed record first to the PC which then transmits the transformed record to the client device.

8. The system of claim 1 wherein the intermediary server system is a subscription system, and maintains client profiles for subscribers to the system, the client profiles including data relative to information destinations on the Internet for a specific client, data records to be retrieved from the destinations, and data forms for transformation of specific records.

9. The system of claim 8 wherein the intermediary server system maintains input and output templates for individual clients, the input templates having slots mapping records by type as received from Internet sources, and the output templates having slots mapping data records by type to be transmitted to the client, there being specific correlation between input template slots and output template slots for an individual client.

10. The system of claim 8 wherein data forms for transformation to transmit to client devices include one or more of conventional telephone protocol, Internet protocol telephony Protocol (IPNT), voice mail, e-mail, pager message, and records for applications common to personal digital assistants (PDAs), including one or more of appointment-book data records, memo-pad records, alarm records, and things-to-do records.

11. The system of claim 10 wherein airline reservations retrieved for a client from the Internet are converted into multiple appointment-book entries displayable by an appointment-book application on a PDA, one appointment book entry for each individual flight in a reservation.

12. The system of claim 10 wherein an alarm is generated for each flight at a time preceding flight time for each flight.

13. The system of claim 12 wherein a different alarm interval is used for domestic flights than for International flights.

14. The system of claim 10 wherein billing schedules retrieved for a client are converted into two or more records, one being a memo pad record detailing the details of the bill, and another being a things-to-do record to remind the client of the time the bill is due.

15. The system of claim 14 wherein an alarm record is entered to generate an alarm prior to the time the bill is due, to remind the client that the bill is due.

16. The system of claim 1 wherein the intermediary server system is implemented in association with an Internet Service provider site.

17. The system of claim 1 wherein the intermediary server system includes an aggregation service for aggregating client-specific records prior to transmission to client devices.

18. The system of claim 17 further comprising a synchronization service for keeping data on client devices synchronized with data from sources on the Internet and from the aggregation service.

19. The system of claim 18 wherein the synchronization service uses an algorithm enabled to adaptively minimize round trip messages between the intermediary server system and the client device according to whether the client device is more limited by latency or bandwidth.

20. The system of claim 19 wherein the algorithm computes Cyclic Redundancy Check (CRC) codes for input and output records, and computes intersections between CRCs on records on the client device and at the aggregation service, the output of the algorithm being exactly the records that need to be sent to the client device and exactly the list of records that need to be deleted form the client device to keep the data sets in synchronization.

21. A method for retrieving and disseminating information records from Internet sources, comprising steps of:
(a) collecting a record in a first data form from an Internet source by an intermediary server system connected to the Internet;
(b) transforming the record into a second data form specific to an application other than an Internet browser application, the application executable by a client device connectable to the intermediary server system; and
(c) transmitting the transformed record to the client device for display with the client device connected by a data link to the intermediary server system.

22. The method of claim 21 wherein the intermediary server system is connected to the Internet by an Internet-compatible link and the client device is connected to the intermediary server system by other than an Internet-compatible link.

23. The method of claim 22 wherein the other-than-Internet-compatible link is an Internet Protocol Telephony link.

24. The method of claim 22 wherein the other-than-Internet-compatible link is a conventional telephony link operating by a conventional telephony protocol.

25. The method of claim 22 wherein the other-than-Internet-compatible link is a wireless cellular telephony link.

26. The method of claim 22 wherein the other-than-Internet-compatible link is a wireless satellite enhanced link.

27. The method of claim 21 further comprising a personal computer (PC) connected to the intermediary server system by a conventional Internet-compatible link and the client device connects to the PC by an other than Internet-compatible link, and wherein, in step (c) the system transmits the transformed record first to the PC which then transmits the transformed record to the client device.

28. The method of claim 21 wherein the intermediary server system is a subscription system, and maintains client profiles for subscribers to the system, the client profiles including data relative to information destinations on the Internet for a specific client, data records to be retrieved from the destinations, and data forms for transformation of specific records. book data records, memo-pad records, alarm records, and things-to-do records.

29. The method of claim 28 wherein in step (b) the intermediary server system maintains input and output templates for individual clients, the input templates having slots mapping records by type as received from Internet sources, and the output templates having slots mapping data records by type to be transmitted to the client, there being specific correlation between input template slots and output template slots for an individual client.

30. The method of claim 28 wherein data forms for transformation to transmit to client devices include one or more of conventional telephone protocol, Internet protocol telephony Protocol (IPNT), voice mail, e-mail, pager message, and records for applications common to personal digital assistants (PDAs), including one or more of appointment-book data records, memo-pad records, alarm records, and things-to-do records.

31. The method of claim 30 wherein airline reservations retrieved for a client from the Internet are converted into multiple appointment-book entries displayable by an appointment-book application on a PDA, one appointment book entry for each individual flight in a reservation.

32. The method of claim 30 wherein an alarm is generated for each flight at a time preceding flight time for each flight.

33. The method of claim 32 wherein a different alarm interval is used for domestic flights than for International flights.

34. The method of claim 30 wherein billing schedules retrieved for a client are converted into two or more records, one being a memo pad record detailing the details of the bill, and another being a things-to-do record to remind the client of the time the bill is due.

35. The method of claim 34 wherein an alarm record is entered to generate an alarm prior to the time the bill is due, to remind the client that the bill is due.

36. The method of claim 21 wherein the intermediary server system is implemented in association with an Internet Service provider site.

37. The method of claim 21 wherein the intermediary server system includes an aggregation service for aggregating client-specific records prior to transmission to client devices.

38. The method of claim 37 further comprising a synchronization service for keeping data on client devices synchronized with data from sources on the Internet and from the aggregation service.

39. The method of claim 38 wherein the synchronization service uses an algorithm enabled to adaptively minimize round trip messages between the intermediary server system and the client device according to whether the client device is more limited by latency or bandwidth.

40. The method of claim 39 wherein the algorithm computes Cyclic Redundancy Check (CRC) codes for input and output records, and computes intersections between CRCs on records on the client device and at the aggregation service, the output of the algorithm being exactly the records that need to be sent to the client device and exactly the list of records that need to be deleted form the client device to keep the data sets in synchronization.

* * * * *